United States Patent
Burdeniuc et al.

(10) Patent No.: US 10,023,681 B2
(45) Date of Patent: Jul. 17, 2018

(54) DELAY ACTION CATALYST FOR IMPROVING THE STABILITY OF POLYURETHANE SYSTEMS HAVING HALOGEN CONTAINING BLOWING AGENTS

(71) Applicant: EVONIK DEGUSSA GMBH, Essen (DE)

(72) Inventors: Juan Jesus Burdeniuc, Colmar, PA (US); Jean Louise Vincent, Bethlehem, PA (US); Tadao Yasue, Kawasaki (JP); Timothy J. Miller, Northampton, PA (US); Renee Jo Keller, Orwigsburg, PA (US)

(73) Assignee: Evonik Degussa GmbH, Essen (DE)

(*) Notice: Subject to any disclaimer, the term of this patent is extended or adjusted under 35 U.S.C. 154(b) by 279 days.

(21) Appl. No.: 13/951,958

(22) Filed: Jul. 26, 2013

(65) Prior Publication Data
US 2014/0113984 A1 Apr. 24, 2014

Related U.S. Application Data

(60) Provisional application No. 61/717,690, filed on Oct. 24, 2012.

(51) Int. Cl.
| | | |
|---|---|---|
| *C08G 18/18* | (2006.01) | |
| *C08G 18/50* | (2006.01) | |
| *C08G 18/54* | (2006.01) | |
| *C08J 9/14* | (2006.01) | |
| *C08G 18/09* | (2006.01) | |
| *C08G 18/22* | (2006.01) | |
| *C08G 18/40* | (2006.01) | |
| *C08J 9/02* | (2006.01) | |
| *C08G 18/20* | (2006.01) | |
| *C08G 18/34* | (2006.01) | |
| *C08G 101/00* | (2006.01) | |

(52) U.S. Cl.
CPC ....... *C08G 18/1858* (2013.01); *C08G 18/092* (2013.01); *C08G 18/1825* (2013.01); *C08G 18/1833* (2013.01); *C08G 18/2027* (2013.01); *C08G 18/225* (2013.01); *C08G 18/227* (2013.01); *C08G 18/34* (2013.01); *C08G 18/4027* (2013.01); *C08G 18/5021* (2013.01); *C08G 18/546* (2013.01); *C08J 9/02* (2013.01); *C08J 9/144* (2013.01); *C08G 2101/0025* (2013.01); *C08G 2105/02* (2013.01); *C08J 2201/022* (2013.01); *C08J 2203/162* (2013.01); *C08J 2205/052* (2013.01); *C08J 2205/10* (2013.01); *C08J 2207/04* (2013.01); *C08J 2375/04* (2013.01)

(58) Field of Classification Search
CPC ............ C08G 18/092; C08G 18/1825; C08G 18/1858; C08G 18/225; C08G 18/227; C08G 18/4027; C08G 18/5027; C08G 18/546; C08G 2101/0025; C08G 2105/02; C08J 9/02; C08J 9/144; C08J 2201/022; C08J 2203/162; C08J 2205/052; C08J 2205/10; C08J 2207/04; C08J 2375/04
See application file for complete search history.

(56) References Cited

U.S. PATENT DOCUMENTS

| | | | |
|---|---|---|---|
| 2,932,621 A | 4/1960 | Terry | |
| 3,238,154 A | 3/1966 | Mosso | |
| 3,772,221 A | 11/1973 | Hostettler et al. | |
| 3,892,687 A | 7/1975 | Bechara et al. | |
| 4,025,466 A | 5/1977 | Jourquin | |
| 4,464,488 A | 8/1984 | Zimmerman | |
| 4,758,605 A | 7/1988 | Williams | |
| 5,688,834 A | 11/1997 | Parker et al. | |
| 6,403,665 B1 | 6/2002 | Sieker et al. | |
| 6,825,238 B2 | 11/2004 | Hohl et al. | |
| 2006/0030633 A1* | 2/2006 | Keske | C08G 18/089 521/99 |
| 2006/0281827 A1* | 12/2006 | Bonapersona | C08G 18/092 521/172 |
| 2007/0259773 A1 | 11/2007 | Burdeniuc et al. | |

(Continued)

FOREIGN PATENT DOCUMENTS

| | | |
|---|---|---|
| CA | 2854020 | 5/2013 |
| CN | 1031853 A | 3/1989 |

(Continued)

OTHER PUBLICATIONS

International Search Report dated Feb. 26, 2014.
Honeywell, "Household Refrigerator: Low GWP Blowing Agent Performance Update," www.honeywell.com, CPI 2011, pp. 2-17.

*Primary Examiner* — John Cooney
(74) *Attorney, Agent, or Firm* — Andrew H. Chung; Linda S. Li; Jason S. Ngui

(57) ABSTRACT

Catalyst compositions useful in the production of insulating polyurethane or polyisocyanurate foam are disclosed. The catalyst compositions impart increased stability of a mixture of the catalyst, a halogen-containing blowing agent, and a polyol. These catalyst compositions include amine/acid salts with a pH of <7.0 which can be used in combined with tertiary amine catalysts and metal-based or ammonium-based trimerization catalyst and at least one metal-based gel catalyst and optionally one or more of an additional catalyst described in (1) or (2). These improved catalysts can be used with any halogenated blowing agent, and provide substantial stability benefits with the use of hydrofluoroolefins and hydrofluorochloroolefins. In an exemplary embodiment, a process includes providing a pre-mix comprising an organic carboxylic di-acid, tri-acid or poly-acid component and contacting a tetraalkylguanidine and/or a tertiary amine containing an isocyanate reactive group with the acid component in the pre-mix to form a mixture of tetraalkylguanidine salt or tertiary amine salt or their combination.

17 Claims, No Drawings

(56) References Cited

U.S. PATENT DOCUMENTS

| | | |
|---|---|---|
| 2009/0099272 A1 | 4/2009 | Williams et al. |
| 2009/0099274 A1 | 4/2009 | Van Der Puy et al. |
| 2010/0113634 A1* | 5/2010 | Tokumoto ............ C08G 18/161 521/115 |
| 2011/0152392 A1 | 6/2011 | Van Der Puy et al. |
| 2012/0220677 A1 | 8/2012 | Williams et al. |

FOREIGN PATENT DOCUMENTS

| | | |
|---|---|---|
| CN | 101896525 A | 11/2010 |
| CN | 103717633 A | 4/2014 |
| JP | 60055018 | 3/1985 |
| JP | 63295618 | 12/1988 |
| JP | 03153721 | 7/1991 |
| JP | 2001-503461 | 5/1999 |
| JP | 2000-095831 | 4/2000 |
| JP | 2004-529995 | 8/2003 |
| JP | 2009-013247 | 1/2009 |
| JP | 2009052053 A | 3/2009 |
| JP | 2010106192 A | 5/2010 |
| JP | 2011500893 A | 1/2011 |
| JP | 2011252176 A | 12/2011 |
| JP | 2012505294 A | 3/2012 |
| JP | 2013-514452 | 4/2013 |
| KR | 10-2007-0053708 | 5/2007 |
| KR | 10-2007-0093859 | 2/2009 |
| KR | 10-2012-0115982 | 10/2012 |
| WO | 9820058 A1 | 5/1998 |
| WO | 02066531 A2 | 8/2002 |
| WO | 2011038081 A1 | 3/2011 |
| WO | 2011084553 A1 | 7/2011 |
| WO | 2011084563 A2 | 7/2011 |
| WO | 2012115929 A2 | 8/2012 |
| WO | 2012115936 A2 | 8/2012 |
| WO | 2014030654 A1 | 2/2014 |

* cited by examiner

DELAY ACTION CATALYST FOR IMPROVING THE STABILITY OF POLYURETHANE SYSTEMS HAVING HALOGEN CONTAINING BLOWING AGENTS

CROSS-REFERENCE TO RELATED APPLICATIONS

This application claims the benefit of U.S. Application No. 61/717,690, filed on Oct. 24, 2012. The disclosure of Application No. 61/717,690 is hereby incorporated by reference.

BACKGROUND OF THE INVENTION

The field of invention is the composition and application of catalysts useful for the production of insulating polyurethane foam produced with blowing agents containing a halogen.

Polyurethane foam compositions are typically prepared by reacting an isocyanate and a premix which consists of isocyanate-reactive components such as a polyol. The premix optionally also contains other components such as water, flame retardants, blowing agents, foam-stabilizing surfactants, and catalysts to promote the reactions of isocyanate with polyol to make urethane, with water to make $CO_2$ and urea, and with excess isocyanate to make isocyanurate (trimer). The blowing agent in the premix is usually a liquid or gas with a boiling point sufficiently low to be vaporized by the heat released during the polymerization reaction. Examples of blowing agents useful in the production of insulating polyurethane foam include but are not limited to hydrofluorocarbons, hydrofluoroolefins, hydrofluorochloroolefins, hydrochlorofluorocarbons, formates, and hydrocarbons. The proper selection and combination of the components in the premix and the isocyanate can be useful for the production of polyurethane foam that is spray applied, poured in place, and used in applications such as refrigerators, freezers, hot water heaters, insulation panels, garage doors, entry doors, and other various applications where insulation is desired. For some of these applications, the premix is stored for one day up to one year before being reacted with isocyanate to generate polyurethane foam. This is common in sprayfoam applications, where drums of premix and isocyanate are shipped to field locations for on-site application. Thus, it is desirable for the premix of an insulating foam formulation to be both chemically and physically stable. However, the catalysts that are useful to promote the polyurethane reaction can also participate or induce undesired reactions with the blowing agents present in the premix resulting in reduced storage stability. These undesired reactions are prevalent in blowing agents that contain halogens, and are especially problematic in halogenated blowing agents containing unsaturation and olefinic carbons. Common amine catalysts useful for the production of polyurethane foam include tertiary amines, such as N,N,N',N'',N''-pentamethyldiethylenetriamine (available from Air Products as Polycat®-5) or 1,4-diazabicyclo[2.2.2]octane (available in solution from Air Products as Dabco®33LX) which are known to accelerate the urethane reaction promoting the formation of polyurethane polymers. However, tertiary amines are also know to react with halogen containing organic compounds causing deactivation of the tertiary amine catalysts resulting in a net decrease in the kinetic of the polymerization process. Reaction between tertiary amine and halogen containing organic compounds occurs more rapidly when the halogen atom is bound to an olefinic carbon because halogen-substituted olefins are susceptible to nucleophilic attack by tertiary amines. This results in a fast deactivation of the tertiary amine catalysts rendering the premix not active enough for reaction with the isocyanate. Deactivation of tertiary amine by reaction with halogen containing compounds can also occur in halogen containing aliphatic compounds via formation of a quaternary ammonium salt or dehydrohalogenation both pathways resulting in tertiary amine deactivation.

U.S. Pat. No. 3,280,214, which is hereby incorporated by reference in its entirety, describes an organopolysiloxane copolymer and a method for making the organopolysiloxane copolymer. The method includes a single step of producing a wide range of specific block copolymers of organopolysiloxanes. Specifically, the method uses tetramethylguanidine octoate to cure a block copolymer and produce a material with good adhesion to aluminum. The tetramethylguanidine octoate is an aliphatic salt and suffers from a drawback that is temperature dependent when used in curing of elastomeric polyurethane polymers.

U.S. Pat. No. 3,663,258, which is hereby incorporated by reference in its entirety, describes a coating composition containing a dye and tetramethylguanidine trichloroacetate in a solution of inert binder at a pH not higher than 3. The acidic solution of tetramethylguanidinium trichloroacetate is dissolved in the minimum amount of water and the solution is added to a solution of the dye and binder in a water miscible organic solvent. The acid is a very strong organic mono-acid and suffers from a drawback that it slows down the reaction considerably.

U.S. Pat. No. 3,391,113, which is hereby incorporated by reference in its entirety, describes thermo settable resin mixtures that include epoxy resin having a plurality of 1,2-epoxy groups. Tetraalkylguanidines are used to accelerate cure of dicyanamide-epoxy resin mixtures in powder form, prepared by grinding together dicyanamide and tetraalkylguanidine. The process suffers from a drawback that it requires grinding of solids and the composition requires dicyanamide to accelerate the cure of the epoxy resin.

U.S. Pat. No. 4,025,466, which is hereby incorporated by reference in its entirety, describes a process for preparing polyurethane foam. The process includes reacting a polyisocyanate and a polyol in the presence of a catalyst containing the chemical structure =N—C=N— and a metal salt carboxylate. Tetramethylguanidine is used as a catalyst to make polyurethane foam together with carboxylate salts such as sodium formate and potassium acetate. The process suffer from a drawback that formate salts and/or acetate salts would significantly slow down the foaming process particularly in spray foam applications causing sagging of the mixture during application.

A process, a polyurethane composition, a polyurethane product, a process of producing a catalyst composition, and a catalyst that do not suffer from one or more of the above drawbacks would be desirable in the art.

BRIEF SUMMARY OF THE INVENTION

In an exemplary embodiment, a process comprises providing a premix comprising at least one organic carboxylic di-acid, tri-acid or poly-acid component and contacting at least one of tetraalkylguanidine and a tertiary amine containing an isocyanate reactive group with the organic carboxylic acid component in the pre-mix wherein the pre-mix contains at least one of the blowing agents hydrofluorocarbons, hydrochlorocarbon, hydrochloroolefin, hydrofluoroolefins, hydrofluorochloroolefins, fluoroolefin, chloroolefin, hydrochlorofluorocarbons thereby forming a salt of corresponding carboxylic acid.

In another exemplary embodiment, a polyurethane composition comprises at least one polyol component, a catalyst composition, and at least one isocyanate component. The catalyst composition comprises at least one salt of organic carboxylic di-acid, tri-acid or poly-acid made with tetralkylguanidine and/or a tertiary amine catalyst containing an isocyanate reactive group.

In another exemplary embodiment, a polyurethane product comprises being formed by a salt of organic carboxylic di-acid, tri-acid or poly-acid with tetralkylguanidine and/or a tertiary amine catalyst containing an isocyanate reactive group and an isocyanate component.

In another exemplary embodiment, a process of producing a catalyst composition comprises contacting an organic carboxylic di-acid, tri-acid or poly-acid component with tetralkylguanidine and/or a tertiary amine catalyst containing an isocyanate reactive group to form the corresponding salt.

In another exemplary embodiment, a catalyst comprises at least one salt of organic carboxylic di-acid, tri-acid or poly-acid with tetralkylguanidine and/or a tertiary amine catalyst containing an isocyanate reactive group.

One aspect of the invention relates to a polyol premix composition comprising at least one halogenated blowing agent, at least one polyol, water, at least one organic carboxylic acid component comprising at least one member selected from di-acid, tri-acid or poly-acid, and at least one of member selected from the group consisting of tetraalkylguanidine and tertiary amines containing an isocyanate reactive group with the organic carboxylic acid component.

One aspect of the invention relates to a polyol premix composition in which the halogenated blowing agent contains a hydrohaloolefin.

One aspect of the invention relates to any of the foregoing aspects wherein the hydrohaloolefin blowing agent comprises trans-1-chloro-3,3,3-trifluoropropene One aspect of the invention relates to any of the foregoing aspects wherein the amine with an isocyanate reactive group comprises at least one member selected from the group consisting of N,N-bis(3-dimethylaminopropyl)-N-isopropanolamine, N,N-dimethylaminoethyl-N'-methyl ethanolamine, N,N,N'-trimethylaminopropyl ethanolamine, N,N-dimethylethanolamine, N,N-dimethyl-N',N'-2-hydroxy(propyl)-1,3-propylenediamine, dimethylaminopropylamine, (N,N-dimethylaminoethoxy)ethanol, methyl-hydroxyethyl-piperazine, bis(N,N-dimethyl-3-aminopropyl)amine, N,N-dimethylaminopropyl urea, N,N'-bis(3-dimethylaminopropyl)urea, bis(dimethylamino)-2-propanol, N-(3-aminopropyl)imidazole), N-(2-hydroxypropyl)imidazole, and N-(2-hydroxyethyl) imidazole, 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl)ether or combinations thereof.

One aspect of the invention relates to any of the foregoing aspects that further comprises at least one solvent.

A further aspect of the invention relates to any of the foregoing aspects wherein the solvent comprises at least one member selected from the group consisting of a glycol, water, and a polyol.

In one aspect of the invention relates to any of the foregoing aspects wherein the tetraalkylguanidine comprises tetramethylguanidine.

One aspect of the invention relates to any of the foregoing aspects wherein the organic acid comprises at least one member selected from the group consisting of succinic acid, glutaric acid, adipic acid, and other di- or poly-acids.

Another aspect of the invention relates to any of the foregoing aspects wherein the organic acid comprises at least one member selected from the group consisting of malonic, maleic, succinic, glutaric, adipic, pimelic, suberic, azelaic, sebacic, glutaconic, traumatic, muconic, phthalic, isophthalic, terephthalic acids, polyacrylic acid, and polysulfonic acid.

Another aspect of the invention relates to any of the foregoing aspects further comprising at least one cell stabilizer.

Another aspect of the invention relates to any of the foregoing aspects further comprising at least one crosslinking agent.

Another aspect of the invention relates to any of the foregoing aspects further comprising at least one chain extender.

A further aspect of the invention relates to any of the foregoing aspects comprising catalyst composition of about 10 to about 50% TMG, about 10 to about 50% succinic acid, and about 0 to about 50% of at least one of water or glycol diluent, wherein the pH of the composition is <7.

One aspect of the invention relates to any of the foregoing aspects and a polyol premix composition comprising at least one polyol, and a contact product obtained from at least one organic carboxylic acid component comprising at least one member selected from di-acid, tri-acid or poly-acid, and at least one of member selected from the group consisting of tetraalkylguanidine and tertiary amines containing an isocyanate reactive group with the organic carboxylic acid component.

Another aspect of the invention relates to any of the foregoing aspects and a polyol premix composition comprising at least one polyol, and a salt of at least one organic carboxylic acid component comprising at least one member selected from di-acid, tri-acid or poly-acid and at least one of member selected from the group consisting of tetraalkylguanidine and tertiary amines containing an isocyanate reactive group with the organic carboxylic acid component.

One aspect of the invention relates to a method for making foam comprising contacting the pre-mix composition of any of the foregoing aspects with at least one isocyanate.

A further aspect of the invention relates to a foam obtained by the foregoing method or any of the foregoing aspects.

Other features and advantages of the present invention will be apparent from the following more detailed description of the preferred aspect or embodiment, taken in conjunction with the accompanying examples which illustrate, by way of example, the principles of the invention.

DETAILED DESCRIPTION OF THE INVENTION

Provided is an exemplary process, a polyurethane composition, a polyurethane product, a process for making polyurethane foam, a process of producing a catalyst composition, and a catalyst. Embodiments of the present disclosure improve the stability of a premix by minimizing the decomposition of the halogen-containing blowing agent, reducing catalysts deactivation by such decomposition process while providing enough catalytic activity as to provide foam rising speeds that are acceptable for practical use as well as finished products with optimum physical properties.

By "stability" it is meant that the pre-mix containing all components of a foamable composition, except isocyanate, after being thermally aged in an oven set at 50° C. for days and weeks will be sufficiently active after aging as to produce foam. During the ageing process decomposition of a hydrofluoroolefin (HFO) blowing agent can occur thereby causing the pre-mix to lose its activity. This deactivation can be measured using standard FOMAT equipment and measuring foam rate of rise profiles which consist of recording height versus time as well as foam rise speed versus time during the course of the polymerization process. One suitable way to measure deactivation is by monitoring changes in the time in seconds to reach the maximum foam rise speed ($V_{max}$) at different periods of time during the ageing process. Improvements in catalyst performance can then be measured by recording the changes $\Delta V_{max} = V_{max\text{-}final} - V_{max\text{-}initial}$. Thus, when comparing catalyst compositions, smaller changes in $\Delta V_{max}$ are desired because such smaller changes are associated with lower activity losses during the ageing process. Smaller changes in $\Delta V_{max}$ means, for example, that a suitable spray foam formulation can still produce foam after ageing without the need of adding extra fresh catalyst to the premix to prevent sagging of the reactive mixture during application, The inventive catalysts are useful for the production of any rigid insulating foam, and are particularly useful for spray applied foam, appliance insulation, insulating construction panels, and various other insulation products containing closed-cell rigid polyurethane foam. This invention includes foams that have an isocyanate index between about 70 and about 500, about 90 to about 270 and typically about 100 to about 150. The catalysts described in this invention could be used in combination with any halogen-containing blowing agent to provide improved system stability, but they are particularly useful for improving the stability of systems containing hydrohaloolefin blowing agents, such as at least one of HFCO-1234ze (trans-1,3,3,3-Tetrafluoroprop-1-ene) and HFCO-1233zd (1-Propene,1-chloro-3,3,3-trifluoro), among other HFOs.

In one embodiment, the invention comprises a process to produce a composition that comprises a salt of at least one of organic carboxylic di-acid, tri-acid or poly-acid (for example malonic, maleic, succinic, glutaric, adipic, pimelic, suberic, azelaic, sebacic, glutaconic, traumatic, muconic, phthalic, isophthalic, terephthalic acids, polyacrylic acid, polysulfonic acid, among others). In one embodiment, the invention provides a process to produce a composition that comprises a contact product of combining at least one of tetraalkylguanidine and a tertiary amine catalyst containing an isocyanate reactive group with at least one organic carboxylic di-acid, tri-acid or poly-acid component (for example malonic, maleic, succinic, glutaric, adipic, pimelic, suberic, azelaic, sebacic, glutaconic, traumatic, muconic, phthalic, isophthalic, terephthalic acids, polyacrylic acid, polysulfonic acid, etc., or combinations thereof). The organic carboxylic acid can comprise a solvent or diluents if the carboxylic acid salt is a solid or semi-solid product or a polyol component without the solvent (for example, if the organic carboxylic acid component is used for forming a liquid product). In one embodiment, if the organic carboxylic acid component is an aromatic carboxylic acid then the phenyl group can be a substituted phenyl group. The equivalent ratio of carboxylic acid to tetraalkylguanidine and tertiary amine ranges from about 0.2 to about 2.0, about 0.3 to about 2.0, about 0.4 to about 2.0, about 0.5 to about 1.5 and in some cases about 0.7 to about 1.0 The salt can be formed by using any suitable conditions such as dissolving the acid in a suitable solvent such as water, ethylene glycol, diethylene glycol, propylene glycol, dipropylene glycol, polyethylene glycol, polypropylene glycol, MP-diol and mixtures thereof followed by the addition of the tetraalkyl guanidine or tertiary amine or their mixtures and can be conducted in any suitable equipment such a glass or stainless steel reactor with a mechanical mixer at atmospheric temperature and pressure or at higher temperatures and pressures if required.

The contact product of the instant invention can have a pH less than 7.0, about 2.0 to about 7.0, about 3.0 to about 7.0 and typically about 4.0 to about 7.0. The contact product can comprise a salt, a salt and residual salt forming materials that can affect the pH, among other components.

In one embodiment, the premix comprises the polyol component, at least one surfactant component, at least one blowing agent component, and at least one crosslinking component. The polyols component comprises one or more standard polyols, one or more natural oil polyols, one or more polyester polyols, one or more Mannich polyols or combinations thereof. Mannich bases are obtained by the condensation reaction of: 1) carbonylic compound, 2) a primary or secondary amine and 3) organic compound with enolyzable acidic hydrogen such as phenols, ketones but most commonly phenol and substituted phenols. The Mannich bases can be used as initiators for alkoxylation reactions with ethylene oxide and propylene oxide giving amine containing polyether polyols called as Mannich polyols. The amount of surfactant can range from about 0.10 pphp to about 10 pphp, about 0.20 pphp to about 8.0 pphp and in some cases about 0.5 pphp to about 3.0 pphp. The blowing agent components can range from about 1 pphp to about 30 pphp, about 5 pphp to about 20 pphp and in some cases about 8 pphp to about 15 pphp. The crosslinking component can range from about 0.20 pphp to about 10 pphp, about 0.5 pphp to about 5 pphp and in some cases about 0.5 pphp to about 3.0 pphp. The premix can be formed by using any suitable conditions such as mixing all the components in a reaction vessel equipped with a mechanical agitator or simply mixing all the premix components in a drum and mechanically mixing the components inside the drum before sealing.

In one embodiment, the standard polyol is used alone, includes polyether polyol. In one embodiment the standard polyol is used in the range about 0 pphp to about 100 pphp, about 0 pphp to about 80 pphp and in some cases about 20 pphp to about 60 pphp. In one embodiment, the natural oil polyol is at an amount of greater than about 0 to about 40 pphp, greater than about 0 to about 20 pphp and in some cases greater than about 0 pphp to about 10 pphp. In one embodiment, the standard polyol is used alone and it is a polyester polyol. In one embodiment, the polyester polyol is used at an amount of about 0 pphp to 100 pphp, about 10 pphp to about 80 pphp and in some cases about 20 pphp to about 60 pphp. In one embodiment the Mannich polyol is used in combination with other polyol and in a range from 0 pphp to 80 pphp, about 0 pphp to about 50 pphp and in some cases about 0 pphp to about 20 pphp.

In one embodiment, the premix further comprises at least one of water, cell stabilizers, chain extenders, pigments, fillers, flame retardants, auxiliary urethane gelling catalysts, auxiliary urethane blowing catalysts, transition metal catalysts, or combinations thereof. As is further described below, in some embodiments, the premix includes further components that are combined through any suitable procedures including those previously described and/or at any suitable portion of the process.

Suitable cell stabilizers include, but are not limited to, silicone surfactants, anionic surfactants, or combinations thereof. In one embodiment, the cell stabilizer is the silicone surfactant, such as, polyalkylsiloxane, polyoxyalkylene polyol-modified dimethylpolysiloxane, alkylene glycol-modified dimethylpolysiloxane, or combinations thereof. In one embodiment, the cell stabilizer is the anionic surfactant, such as, a salt of a fatty acid, a salt of a sulfuric acid ester, a salt of a phosphoric acid ester, a salt of a sulfonic acid, or a combination thereof. In one embodiment, the premix includes the cell stabilizers at a suitable predetermined amount. Suitable cationic surfactants include, but are not limited to quaternary ammonium salts (pH dependent or permanently charged) such as cetyl trimethylammonium chloride, cetyl pyridinium chloride, polyethoxylated tallow amine, benzalkonium chloride, benzethonium chloride and the like. Suitable zwitterionic or amphoteric surfactants include but are not limited to sultaines, aminoacids, imino acids, betaines and phosphates. Suitable non-ionic surfactants include but are not limited to fatty alcohols, polyoxyethylene glycol alkyl ethers, polyoxypropylene glycol alkyl ethers, glucosides (such as decyl, lauryl and octyl glucosides), polyoxyethylene glycol alkyl phenol ethers, glycol alkyl esters, and the like. Suitable predetermined amounts include, but are not limited to, about 0.1 pphp to about 20 pphp, 0.1 pphp to about 10 pphp, 0.1 pphp to about 5 pphp, or any suitable combination or sub-combination thereof.

Suitable crosslinking agents (forming part of or all of crosslinking) include, but are not limited to, low-molecular weight compounds containing at least two isocyanate reactive moieties, such as, hydroxyl groups, primary amino groups, secondary amino groups, other active hydrogen-containing groups that are reactive with an isocyanate group, or combinations thereof. In one embodiment, the crosslinking agent is a polyhydric alcohol (for example, a trihydric alcohol, such as, glycerol or trimethylolpropane), a polyamine, or a combination thereof. In one embodiment with the crosslinking agent being a polyamine, the crosslinking agent is diethyltoluenediamine, chlorodiaminobenzene, diethanolamine, diisopropanolamine, triethanolamine, tripropanolamine, 1,6-hexanediamine, or combinations thereof. In one embodiment with the crosslinking agent being a diamine, the crosslinking agent includes twelve or fewer carbon atoms, seven carbon atoms, or less than seven carbon atoms. The amount of crosslinking agent can range from about 0.20 pphp to about 10 pphp, about 0.5 pphp to about 5 pphp and in some cases about 0.5 pphp to about 3.0 pphp.

Suitable chain extenders include, but are not limited to, compounds having a hydroxyl or amino functional group, such as, glycols, amines, diols, water, or combinations thereof. In one embodiment, the chain extender is ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or combinations thereof. The amount of chain extenders can range from about 0.20 pphp to about 10 pphp, about 0.5 pphp to about 5 pphp and in some cases about 0.5 pphp to about 3.0 pphp.

Suitable pigments include, but are not limited to, organic pigments, inorganic pigments, or combinations thereof. The pigments permit coloring (for example, to match a color grade), concealing (for example, to conceal yellowing), or combinations thereof. In one embodiment with the pigment being an organic pigment, the pigment is an azo/diazo dye, a phthalocyanine, dioxazine, carbon black, or combination thereof. In one embodiment with the pigment being an inorganic pigment, the pigment is titanium dioxide, iron oxide, chromium oxide, or a combination thereof. The amount of pigment can range from about 0 pphp to about 10 pphp, about 0 pphp to about 5 pphp and in some cases about 0.1 pphp to about 3.0 pphp.

Suitable fillers increase the density and load bearing properties of polyurethane foams. In one embodiment, the filler is barium sulfate, calcium carbonate, or a combination thereof. The amount of filler can range from about 0 pphp to about 20 pphp, about 0 pphp to about 10 pphp and in some cases about 1.0 pphp to about 5.0 pphp.

Suitable flame retardants reduce the flammability of polyurethane foams. In one embodiment, the flame retardant is a chlorinated phosphate ester, chlorinated paraffin, a melamine powder, or a combination thereof. In one embodiment, the premix includes the flame retardants at any suitable amount. Suitable amounts include, but are not limited to, about 0 pphp to about 30 pphp, about 0 pphp to about 20 pphp, about 0 pphp to about 10 pphp, about 1 pphp to about 20 pphp, about 1 pphp to about 10 pphp, about 1 pphp to about 5 pphp, or any suitable combination or sub-combination thereof.

A process to make the catalyst of the invention comprises contacting a tetraalkylguanidine and/or a tertiary amine having an isocyanate reactive group with the organic carboxylic di-acid, tri-acid or poly-acid component in the premix, thereby forming the corresponding salt of the organic carboxylic di-acid, tri-acid or poly-acid. The contacting of the tetraalkylguanidine and/or the tertiary amine having and isocyanate reactive group with the organic carboxylic di-acid, tri-acid or poly-acid component in the premix is by any suitable procedure. The presence of the salt can be confirmed by the delay observed in the rate or rise profile of foam made with the salt relative to the non-salted tertiary amine and/or tetraalkylguanidine. The presence of salt can also be confirmed by using conventional spectroscopic techniques such as NMR and IR.

In one embodiment, the tetraalkylguanidine and/or the tertiary amine having an isocyanate reactive group and the organic carboxylic di-acid, tri-acid and poly-acid component are blended for a predetermined ratio and duration (for example, about 10 minutes), with a predetermined mixer (for example, a mechanical mixer), at a predetermined blade rotation speed (for example, about 5000 revolutions per minute), within a predetermined temperature range (for example, between about 21° C. and about 25° C.), or a combination thereof. The blending forms the intermediate mix including the tetraalkylguanidine and/or the tertiary amine having an isocyanate reactive group salt of the organic carboxylic di-acid, tri-acid or poly-acid that is capable of functioning as the catalyst composition.

In one embodiment, the composition produced is the polyurethane composition. In this embodiment, the process involves reacting the premix, having the tetraalkylguanidine and/or the tertiary amine having an isocyanate reactive group salt of organic carboxylic di-acid, tri-acid or poly-acid, with the isocyanate to form the polyurethane composition. The forming of the polyurethane composition includes combining an isocyanate component with the premix. The combining is for a predetermined duration (for example, about 6 seconds), at a predetermined blade rotation speed (for example, about 6,000 revolutions per minute), or a combination thereof. Alternatively, the forming of the polyurethane composition includes combining an isocyanate component with the premix utilizing a spraying foam equipment which consists on contacting all the components at high pressure in a mixing head of a spraying machine.

In one embodiment, the isocyanate component is combined with the premix composition at or about a stoichiometric ratio. In one embodiment, the stoichiometric ratio is based upon an NCO index. The NCO index is the number of equivalents of the isocyanate, divided by the total number of equivalents of active hydrogen, multiplied by 100 (for example, based upon an NCO index being [NCO/(OH+NH)] *100). The polyurethane composition includes the NCO index being within a predetermined range. In one embodiment, the predetermined range is between about 20 and about 500. In one embodiment, where the polyurethane composition is used for producing a spray foam application, the range is between about 20 and about 500. For other applications, the NCO index can range from about 50 to about 300 about 80 to about 250 and about 90 to about 150 In one embodiment, the polyurethane composition is used with a trimerization catalyst to produce polyisocyanurate foams use in foam laminates and includes a range suitable for the use.

The isocyanate component includes any suitable organic isocyanate compound. Suitable organic isocyanate compounds include, but are not limited to, at least one of hexamethylene diisocyanate (HDI), phenylene diisocyanate (PDI), toluene diisocyanate (TDI), 4,4'-diphenylmethane diisocyanate (MDI), isophoronedi-isocyanate (IPDI), or combinations thereof. In one embodiment, the isocyanate component includes 2,4-TDI, 2,6-TDI, or a combination thereof. In one embodiment, the isocyanate component includes, by weight, about 80% 2,4-TDI and about 20% or a remainder 2,6-TDI. In one embodiment, the isocyanate component includes crude MDI, such as, a mixture of about 60% 4,4'-MDI and/or a stoichiometric amount along with other isomeric and analogous higher polyisocyanates. Other suitable isocyanates are shown and described in U.S. Pat. No. 4,394,491, which is hereby incorporated by reference in its entirety.

In one embodiment, the premix includes, by weight, at least about 20% of polyol between about 0.5% and about 10% of surfactant, between about 1% and about 30% being the blowing agent component, between about 0.5% and about 4% being the crosslinking component, between about 0.25% and about 15% being the catalyst composition, with the amount of the isocyanate component being based upon the NCO index being between about 20 and about 500. In a further embodiment, the polyol component includes polyether polyol, a natural oil polyol and/or a polyester polyol. In one embodiment, the polyether polyol has an average molecular weight between about 500 and about 20,000 and/or a hydroxyl number between about 400 and about 10 and more preferably an average molecular weight between 2000 and 5000 and/or hydroxyl number between about 50 and about 20.

In one embodiment, the premix include(s) about 100 pphp of the polyol component (for example, about 70 pphp being a polyester polyol and/or about 30 pphp being a Mannich polyol), about 2.0 pphp being the surfactant component, about 1.5 pphp being water, and the isocyanate component having an NCO index of about 180. The premix also include(s) the catalyst composition of the invention. In a further embodiment, the premix include(s) about 30 pphp of the flame retardant (for example, tris-(2-chloropropyl)phosphate), 20 pphp of blowing agent, 1.0 pphp metal catalyst and 0.10 pphp to 10 pphp trimerization catalyst.

The base polyol in the premix reacts with the isocyanate to produce the polyurethane foam composition. In one embodiment, the base polyol is a polyether polyol. Suitable polyether polyols are shown and described in WO 03/016373 A1, WO 01/58976 A1, WO 04/060956 A1, WO 03/016372 A1, and WO 03/055930 A1, each of which are hereby incorporated by reference in their entirety. In one embodiment, the polyether polyols are poly(alkylene oxide) polymers, such as, poly(ethylene oxide), poly(propylene oxide), and/or copolymers with terminal hydroxyl groups derived from polyhydric compounds (for example, diols and triols). In one embodiment, the diols and triols utilized are ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, other suitable low molecular weight polyols, or combinations thereof. In one embodiment, the polyether polyol is or includes polyhydroxy-terminated acetal resin, hydroxy-terminated amine, hydroxyl-terminated polyamine, or a combination thereof. In one embodiment, the base polyol is or includes polyalkylene carbonate-based polyols, phosphate-based polyols, or combinations thereof.

In one embodiment, the base polyol comprises a single high molecular weight polyether polyol. In another embodiment, the base polyol comprises a mixture of high molecular weight polyether polyols, each having a different molecular weight or different chemical composition. In this embodiment, the base polyol comprises di-functional and tri-functional materials, such as, but not limited to, polyethylene glycol, polypropylene glycol, glycerol-based polyether triols, trimethylolpropane-based polyether triols, other similar compounds or mixtures, or combinations thereof.

In one embodiment, the polyurea modified polyol is formed by the reaction of a diamine and a diisocyanate in the presence of the starting polyol. In this embodiment, the polyurea modified polyol includes polyurea dispersion. In one embodiment, the polyurea modified polyol is or includes polyisocyanate poly addition (PIPA) polyols, for example, formed in situ from a reaction of the isocyanate and an alkanolamine in the starting polyol.

In one embodiment, the base polyol is or includes a natural oil polyol. Generally, the natural oil polyols are less expensive and from renewable resources, thereby providing environmental benefits. The natural oil polyols include triglycerides of saturated and/or unsaturated acids having a carbon chain length between 12 and 24. The saturated acids are lauric acid, myristic acid, palmitic acid, steric acid, arachidic acid, lignoceric acid, or a combination thereof. The unsaturated acids are mono-unsaturated (for example, palmitoleic acid, oleic acid, or a combination thereof) and/or poly-unsaturated (for example, linoleic acid, linolenic acid, arachidonic acid, or a combination thereof). One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation followed by ring opening or hydroformilation followed by hydrogenation. Alternatively, trans-esterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination.

In one embodiment, the natural oil polyol used as or in the base polyol is castor oil. The castor oil is a natural triglyceride of ricinoleic acid having a low hydroxyl content.

In one embodiment, a natural oil or fat is modified to form the natural oil polyol. In this embodiment, an epoxidized natural oil is reacted with a ring opening acid catalyst and a ring opener. The epoxidized natural oil is a plant-based oil, such as epoxidized vegetable oil and/or epoxidized animal fat. Suitable epoxidized natural oils that are plant-based oils include, but are not limited to, soybean oil, corn oil, sunflower oil, olive oil, canola oil, sesame oil, palm oil, rapeseed oil, tung oil, cottonseed oil, safflower oil, peanut oil, linseed oil, or a combination thereof. Suitable epoxidized natural oils that are epoxidized animal fat are fish fat, tallow, lard, or a combination thereof. Other suitable epoxidized natural oils are shown and described in WO 06/116456 A1, which is hereby incorporated by reference in its entirety.

In one embodiment, the natural oil or the fat is modified by increasing hydroxy content through chemical reaction at unsaturated sites and/or at ester functional groups. For example, in one embodiment, the unsaturated sites are hydroxylated via epoxidation/ring opening and/or hydroformylation/hydrogenation. In one embodiment, the ring opening of the epoxidized natural oil is with alcohol, water, and other compounds having one or more nucleophilic groups. In a further embodiment, the epoxidized natural oil is also oligomerized. In one embodiment, the hydroformylation/hydrogenation of the epoxidized natural oil is in a reactor (not shown) filled with a hydrogen/carbon monoxide mixture in the presence of a suitable catalyst (for example, cobalt, rhodium, or combinations thereof) to form an aldehyde that is hydrogenated in the presence of a cobalt catalyst or a nickel catalyst to form a polyol.

In one embodiment, ester functional groups in suitable reactants are modified by trans-esterification to introduce hydroxy groups. In this embodiment, a suitable polyhydroxy containing substance and trans-esterification catalyst (for example, an alkali metal or alkali earth metal base or salt) produce the polyol of the natural oil or fat. The trans-esterification includes any suitable natural oil or partially hydrogenated oil. Suitable natural oils include, but are not limited to, soybean, corn, cottonseed, peanut, castor, sunflower, canola, rapeseed, safflower, fish, seal, palm, tung, olive oil, or combinations thereof. Suitable multifunctional hydroxyl compounds include, but are not limited to, lactose, maltose, raffinose, sucrose, sorbitol, xylitol, erythritol, mannitol, or combinations thereof.

In one embodiment, the polyol component includes polyols typically used for making rigid PIR/PUR (polyisocyanurate and/or polyurethane) foam. Such polyols include, but are not limited to, polyalkylene ether and polyester polyols. In one embodiment, the polyalkylene ether includes a poly (alkyleneoxide) polymer, such as, poly(ethyleneoxide) and poly(propyleneoxide) polymers and copolymers with terminal hydroxyl groups derived from polyhydric compounds including diols and triols, for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, sugars such as sucrose and like low molecular weight polyols, or combinations thereof. In another embodiment, the polyol component includes amine polyether polyols that can be prepared when an amine, such as ethylenediamine, diethylenetriamine, tolylenediamine, diphenylmethanediamine, triethanolamine, or the like, is reacted with ethylene oxide or propylene oxide. In one embodiment directed to spray foam formulation, the polyol component includes polyether polyols, thereby increasing reactivity of the polyurethane composition. In one embodiment, the polyether polyols are prepared by condensation of phenol with formaldehyde in the presence of hydroxyl-containing amines such as diethanolamine, ethanolamine, and the like.

In one embodiment, the polyol component includes a single high molecular weight polyether polyol. Additionally or alternatively, in one embodiment, mixtures of high molecular weight polyether polyols, such as mixtures of different multifunctional materials and/or different molecular weight or different chemical composition, are included in the polyol component.

In one embodiment, the polyol component includes a polyester polyol produced when a dicarboxylic acid is reacted with an excess of a diol, for example, adipic acid, phathalic acid, phthalic anhydride with ethylene glycol, diethylene glycol, polyethylene glycol, propylene glycol, dipropylene glycol, polypropylene glycol or butanediol, or when a lactone is reacted with an excess of a diol, such as, caprolactone with propylene glycol.

The total amount of polyol, including blends thereof, can range from about 10 to about 80%, about 20% to about 60% and about 30% to about 50 wt % of the pre-mix.

In one embodiment, the polyurethane composition includes improved foam kinetics when the premix is aged or heat aged (e.g., aged by allowing the premix stand over a period of time and monitoring the activity periodically as to determine the activity loss for example by measuring the increase the time in seconds to reach the maximum foam velocity ($V_{max}$) or heat aged by placing the premix in an heated and conditioned oven at 50° C. over a period of time and measuring periodically the reactivity loss in the same manner. Such properties include, but are not limited to, a minimal change in the time for maximum foam rise speed when aging the premix in an oven at 50° C. (for example, time for maximum foam rise speed of 2.7 seconds with no ageing, to 3.1 seconds after one week ageing, to 3.3 seconds after 2 weeks ageing as shown in example 8), a minimal change in cream time when aging the premix in an oven at 50° C. (for example, cream time changes from 1.1 seconds with no ageing to 1.3 seconds after one week aging and to 1.5 seconds after two week aging as shown in example 8), a minimal change to no change in gel time when aging the premix at 50° C. (for example gel time of 4 seconds with no ageing to gel time of 5 seconds with one week ageing to gel time of 4 seconds after 2 weeks ageing as shown in example 8).

In one embodiment, the polyurethane composition includes improved foam kinetics when the premix is aged or heat aged. Such properties include, but are not limited to, a minimal change in the time for maximum foam rise speed when aging the premix in an oven at 50° C. (for example, time for maximum foam rise speed of 4.1 seconds with no ageing, to 4.4 seconds after one week ageing, to 48 seconds after 2 weeks ageing as shown in example 9), a minimal change in cream time when aging the premix in an oven at 50° C. (for example, cream time changes from 2.0 seconds with no ageing to 1.9 seconds after one week aging and to 2.1 seconds after two week aging as shown in example 9), a minimal change to no change in gel time when aging the premix at 50° C. (for example gel time of 7 seconds with no ageing to gel time of 9 seconds with one week ageing to gel time of 13 seconds after 2 weeks ageing as shown in example 9).

In one embodiment, the catalyst composition comprises the tetraalkylguanidine salt of organic carboxylic di-acid, tri-acids and poly-acids, for example malonic, maleic, succinic, glutaric, adipic, pimelic, suberic, azelaic, sebacic, glutaconic, traumatic, muconic, phthalic, isophthalic, terephthalic acids, polyacrylic acid, polysulfonic acid, etc, or combinations thereof.

In one embodiment, the catalyst composition comprises the tertiary amine salt of organic carboxylic di-acid, tri-acids and poly-acids, for example malonic, maleic, succinic, glutaric, adipic, pimelic, suberic, azelaic, sebacic, glutaconic, traumatic, muconic, phthalic, isophthalic, terephthalic acids, polyacrylic acid, etc, or combinations thereof.

In another embodiment, the catalyst composition includes a salt of organic carboxylic di-acid, tri-acids and poly-acids, for example malonic, maleic, succinic, glutaric, adipic, pimelic, suberic, azelaic, sebacic, glutaconic, traumatic, muconic, phthalic, isophthalic, terephthalic acids, polyacrylic acid, etc, or combinations thereof with a combination of the tetraalkylguanidine and the tertiary amine catalyst component. The tertiary amine catalyst component includes or does not include an isocyanate reactive group.

The catalyst salt composition can comprise about 0.1 pphp to about, about 30 pphp to about 15 pphp and about 5 pphp to about 1 pphp of the pre-mix composition.

The tertiary amine catalyst component is or includes N,N-bis(3-dimethylaminopropyl)-N-isopropanolamine, N,N-dimethylaminoethyl-N'-methyl ethanolamine, N,N-dimethylaminopropyl-N'-methyl ethanolamine, N,N,N'-trimethylaminopropyl ethanolamine, N,N-dimethylethanolamine, N,N-dimethyl-N',N'-2-hydroxy(propyl)-1,3-propylenediamine, dimethylaminopropylamine, (N,N-dimethylaminoethoxy)ethanol, methyl-hydroxy-ethyl-piperazine, bis(N,N-dimethyl-3-aminopropyl)amine, N,N-dimethylaminopropyl urea, N,N'-bis(3-dimethylaminopropyl) urea, bis(dimethylamino)-2-propanol, N-(3-aminopropyl)imidazole), N-(2-hydroxypropyl)imidazole, and N-(2-hydroxyethyl) imidazole, or combinations thereof. Additionally or alternatively, in one embodiment, the tertiary amine catalyst component is or includes a blowing catalyst component. For example, in one embodiment, the tertiary amine catalyst component is or includes 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl)ether, or combinations thereof.

In one embodiment, the tertiary amine catalyst component is highly volatile and is not isocyanate-reactive. For example, in one embodiment, the tertiary amine catalyst component is a volatile gelling catalyst and is or includes diazobicyclooctane (triethylenediamine), 1,8-diazabicycloundec-7-ene, tris(dimethylaminopropyl)amine, 1,3,5-tris (dimethylaminopropyl) hexahydrotriazine, N-methyldicyclohexylamine, pentamethyldipropylenetriamine, tributylamine, dimethylaminocyclohexylamine, bis(dimethylaminopropyl)-N-methylamine, or combinations thereof. Additionally or alternatively, in one embodiment, the tertiary amine catalyst component is or includes a volatile blowing catalyst and is or includes bis-dimethylaminoethyl ether, pentamethyldiethylenetriamine, hexamethyltriethylenetetramine, heptamethyltetraethylenepentamine and related compositions, higher permethylated polyamines, 2-[N-(dimethylaminoethoxyethyl)-N-methylamino]ethanol and related structures, alkoxylated polyamines, imidazole-boron compositions, amino propyl-bis(amino-ethyl)ether compositions, or combinations thereof.

In one embodiment, the tertiary amine catalyst component is used in conjunction with a transition metal catalyst. For example, in one embodiment, the tertiary amine catalyst component is used with an organotin compound, tin(II) carboxylate salts, bismuth(III) carboxylate salts, or combinations thereof. Examples of transition metal catalysts such as organotin compounds or bismuth carboxylates can comprise at least one member selected from the group consisting of dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate, dimethyltin bi(2-thylhexyl mercaptacetate), dibutyltin bi(2-thylhexyl mercaptacetate), stannous octate, other suitable organotin catalysts, or a combination thereof. Other metals can also be included, such as, for example, bismuth (Bi). Suitable bismuth carboxylate salts includes salts of pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, and other suitable carboxylic acids. Other salts of transition metals of lead (Pb), iron (Fe), zinc (Zn) with pentanoic acid, neopentanoic acid, hexanoic acid, 2-ethylhexyl carboxylic acid, octanoic acid, neooctanoic acid, neoheptanoic acid, neodecanoic acid, neoundecanoic acid, neododecanoic acid, and other suitable carboxylic acids may also be included. In the embodiments without the tertiary amine catalyst component, the catalyst composition having the tetraalkylguanidine salt of aromatic carboxylic acid is used with or without such transition metal catalysts. In an embodiment where the catalyst composition is used without the tertiary amine catalyst component or transition metal catalyst, the tetraalkylguanidine salt of aromatic carboxylic acid is at a predetermined amount, for example, between about 0.1 and about 30 parts per million (ppm), between about 0.1 and about 15 ppm, between about 0.1 and about 5.0 ppm, or any suitable combination or sub-combination thereof.

In one embodiment, the catalyst composition includes a predetermined amount of tertiary amine catalyst component and the tetraalkylguanidine salt of organic carboxylic di-acid, tri-acids and poly-acids, for example malonic, maleic, succinic, glutaric, adipic, pimelic, suberic, azelaic, sebacic, glutaconic, traumatic, muconic, phthalic, isophthalic, terephthalic acids, polyacrylic acid, etc, or combinations thereof.

In one embodiment, the catalyst composition includes tetramethylguanidine used in combination with succinic acid with a tetramethylguanidine/succinic acid molar ratio 1.0/0.5 and 1.0/0.6 as shown in example 6.

In one embodiment the tetramethylguanidine/succinic acid salts can be solubilized if needed in a carrier solvent such as water, ethylene glycol, diethylene glycol, polyethylene glycol, propylene glycol, dipropylene glycol, polypropylene glycol, MP-diol, polyether polyols, and their mixtures. The amount of carrier is sufficient to fully dissolve a solid salt and it can range from about 5% to about 80%, about 10% to about 70 and in some cases about 20% to about 50%.

In another embodiment the catalyst is a tertiary amine catalyst containing an isocyanate reactive group such as primary —OH group, secondary —OH group, primary amine, secondary amine, amide, urea, urethane, imine in the presence of an organic carboxylic di-acid, tri-acids and poly-acids, for example malonic, maleic, succinic, glutaric, adipic, pimelic, suberic, azelaic, sebacic, glutaconic, traumatic, muconic, phthalic, isophthalic, terephthalic acids, polyacrylic acid, etc, or combinations thereof. Examples of catalysts with isocyanate reactive groups includes N,N-bis(3-dimethylaminopropyl)-N-isopropanolamine, N,N-dimethylaminoethyl-N'-methyl ethanolamine, N,N,N'-trimethylaminopropyl ethanolamine, N,N-dimethylethanolamine, N,N-dimethyl-N',N'-2-hydroxy(propyl)-1,3-propylenediamine, dimethylaminopropylamine, (N,N-dimethylaminoethoxy)ethanol, methyl-hydroxy-ethyl-piperazine, bis(N,N-dimethyl-3-aminopropyl)amine, N,N-dimethylaminopropyl urea, N,N'-bis(3-dimethylaminopropyl) urea, bis(dimethylamino)-2-propanol, N-(3-aminopropyl)imidazole), N-(2-hydroxypropyl)imidazole, and N-(2-hydroxyethyl) imidazole, or combinations thereof. Additionally or alternatively, in one embodiment, the tertiary amine catalyst component is or includes a blowing catalyst component. For example, in one embodiment, the tertiary amine catalyst component is or includes 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl)ether, or combinations thereof.

In one embodiment the reactive catalyst is N,N-dimethylaminoethyl-N'-methyl ethanolamine (commercially available from Air Products & Chemicals as DABCO®-T) used in combination with succinic acid in a molar ratio DABCO®-T/succinic acid 1.0/0.5 and 1.0/0.6 as shown in example 7.

In one embodiment the reactive catalyst is N,N-dimethylaminoethyl-N'-methyl ethanolamine (commercially available from Air Products & Chemicals as DABCO®-T) used in combination with glutaric acid in a molar ratio DABCO®-T/glutaric acid 1.0/0.5; 1.0/0.6; 1.0/0.8 and 1.0/1.0 as shown in example 8.

In one embodiment the reactive catalyst is N,N-dimethylaminoethyl-N'-methyl ethanolamine (commercially available from Air Products & Chemicals as DABCO®-T) used in combination with glutaric acid in a molar ratio DABCO®-T/glutaric acid 1.0/1.0 which was prepared by solubilizing 1.0 mol of DABCO®-T with 1.0 mole of glutaric acid in sufficient ethylene glycol to give a 80% solution of DABCO®-T/Glutaric acid salt is combined with a tetramethylguanidine/succinic acid salt prepared by mixing 1 mole of tetramethylguanidine with 0.6 mole of succinic acid in sufficient ethylene glycol solvent to give a 65% solution in ethylene glycol as shown in example 9.

In a further aspect of the invention, the inventive pre-mix and foam making process are substantially free of primary amines. By "substantially free of primary amines" it is meant that the pre-mix and foaming process contain less than about 0.5 pphp, less than about 0.2 and typically 0 pphp or about 0 pphp to less than about 0.5 pphp of any member selected from the group consisting of amines containing isocyanate reactive groups such as N,N-bis(3-dimethylaminopropyl)-N-isopropanolamine, N,N-dimethylaminoethyl-N'-methyl ethanolamine (DABCO®), N,N,N'-trimethylaminopropyl ethanolamine, N,N-dimethylethanolamine, N,N-dimethyl-N',N'-2-hydroxy(propyl)-1,3-propylenediamine, dimethylaminopropylamine, (N,N-dimethylaminoethoxy)ethanol, methyl-hydroxy-ethyl-piperazine, bis(N,N-dimethyl-3-aminopropyl)amine, N,N-dim ethylaminopropyl urea, N,N'-bis(3-dimethylaminopropyl) urea, bis(dimethylamino)-2-propanol, N-(3-aminopropyl)imidazole), N-(2-hydroxypropyl)imidazole, and N-(2-hydroxyethyl) imidazole, or combinations thereof. Additionally or alternatively, in one embodiment, the inventive pre-mix and foam making process are substantially free of tertiary amine catalyst component that is or includes a blowing catalyst component. For example, in one embodiment, the inventive pre-mix and foam making process are substantially free of tertiary amine catalyst component that is or includes 2-[N-(dimethylaminoethoxyethyl)-N-methylamino]ethanol, N,N-dimethylaminoethyl-N'-methyl-N'-ethanol, dimethylaminoethoxyethanol, or N,N,N'-trimethyl-N'-3-aminopropyl-bis(aminoethyl) ether The following Examples are provided to illustrate certain embodiments of the invention and do not limit the scope of the claims appended hereto.

Example 1: Evaluation of Formulations Containing Conventional Amine Catalysts in the Presence of HFO as Blowing Agent Trans-1-Chloro-3,3,3-Trifluoropropene Foams may be made according to the methods known in the art using typical polyurethane formulations to which have been added a urethane catalyst comprising one or more alkyl tertiary amines. The amount of polyisocyanate used in polyurethane formulations according to the invention is not limited, but it will typically be within those ranges known to those of skill in the art. Exemplary ranges are given in the tables, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]×100

In some embodiments of the invention, the catalyst composition may be combined into a package with one or more polyester polyols, and optionally with one or more blowing agents and/or other additives commonly used in polyurethane formation. Examples of these other optional components have been listed previously, and they do not affect the basic nature of the invention. Such mixtures may subsequently be combined with an organic isocyanate to form polyurethane foam, again optionally in the presence of other additives known in the art. In addition to making rigid spray foams, the invention may also be used to prepare other rigid foams that are commonly utilized for many industrial applications such as appliances, laminate panels for construction and insulation.

TABLE 1

Spray Rigid Foam Formulation A

| Formulation A | PPHP |
|---|---|
| [1]Polyester Polyol | 50 |
| [2]Polyether Polyol | 50 |
| Fire Retardant (2-chloropopylphosphoester) | 20 |
| [3]Dabco ® PM300 | 3.00 |
| [3]Dabco ® DC193 | 0.64 |

TABLE 1-continued

Spray Rigid Foam Formulation A

| Formulation A | PPHP |
|---|---|
| [4]Dabco ® LK443 | 0 |
| Catalyst | Variable |
| water | 3.0 |
| Blowing agent | 10 |

[1]A standard commercially available polyester polyol with an average equivalent weight of 184; average functionality of 2.2 and OH# of 305;
[2]A standard commercially available nonyl phenol initiated Mannich polyol with a MW of approximately 400, OH# of 470, average functionality of 3.3;
[3]DABCO ® PM300 and DABCO ® DC193 aredimethylpolysiloxane (polyoxyethyleneglycol) silicone copolymer surfactants commercially available from Air Products & Chemicals;
[4]DABCO ® LK443 is 35% of DibutylmaleateN-Vinyl-2-pyrrolidone-copolymer in 65% polypropyleneglycol commercially available organic surfactants from Air Products & Chemicals Inc Table 1 above shows typical rigid spray foam formulation-A used to evaluate different catalysts. All components in Table 1 except the isocyanate were mixed and allowed cooling to about 5° C. before mixing with the corresponding amount of isocyanates. Approximately 25 g of the above premix were mixed with 25 g of isocyanate (MDI) in a mechanical agitator in a two litter plastic container. A sample of the component mixture excluding the isocyanate was place in a close container and conditioned in an oven at 50° C. Samples were taken for foam preparation after 1 day, 7 days and 14 days. The samples were allow to reach equilibrium at room temperature and then were mixed with the corresponding amount of isocyanate under vigorous mechanical stirring provided by a mechanical mixing blade at about 6000 rpm. Foam rise was measured under sonar detection equipment (FOMAT model no V3.5 and standard software included with the FOMAT equipment) and choice time was recorded for each case. Choice times were measured in seconds and it represents the time it takes each foaming mass to reach 80% of the full height. Table below provides foam choice times in seconds for standard catalysts DABCO®33LX and POLYCAT®-5 after 1 day (T1), 7 days (T2) and 14 days (T3). Choice time is the time required for free rise foam to reach 80% of its full height.

| Catalyst | Use level (PPHP) | T1 (seconds) | T2 (seconds) | T3 (seconds) | ΔT (T3 – t1) |
|---|---|---|---|---|---|
| POLYCAT ®-5 (pentamethyldiethylenetriamine) | 2.83 | 12 | 17 | 22 | 10 |
| DABCO ®-33LX (33% solution of triethylenediamine in MP-diol) | 0.93 | 33 | 49 | 48 | 15 |

Ageing of premix blends stored at 50° C. resulted in significant loss in catalytic activity as evidenced by the higher choice time.

Example 2: Evaluation of Formulations Containing Sterically Hindered Amine Catalysts and Functionalized Tertiary Amine Catalysts Having NCO Reactive Groups in the Presence of HFO Blowing Agent Trans-1-Chloro-3,3,3-Trifluoropropene In this example evaluation of Polycat®-12, a typical sterically hindered tertiary amine, was to illustrate the benefits and shortfalls of this class of compounds using spray rigid foam formulation B. Also in this example the performance of DABCO®-T is shown as an example of a typical tertiary amine having an OH group (an NCO reactive group) commonly used in spray foam applications.

TABLE 2

Spray Rigid Foam Formulation B

| Component | Parts by Wt (pphp) |
|---|---|
| [1]Polyester Polyol | 70 |
| [2]Mannich Polyol | 30 |
| [3]Surfactant (LK443) | 2.0 |
| [4]Blowing Agent | 20 |
| Water | 1.5 |
| Amine Catalyst | Variable |
| [5]Metal Catalyst | 1.0 |
| [6]Trimerization Catalyst (TMR7) | 0.1-10 |
| Fire Retardant (2-chloropopylphoshoester) | 30.0 |
| Polymeric MDI (% NCO = 30.6) | 160 |
| Isocyanate Index (NCO Index) | 150-200 |

[1]A standard commercially available polyester polyol with a functionality of 2 and OH# of 315;
[2]A standard commercially available nonylphenol initiated Mannich polyol with a MW of approximately 400, OH# of 470, average functionality of 3.3;
[3]DABCO ®LK443 is a commercially available organic surfactants from Air Products & Chemicals Inc;
[4]Blowing agent is 1-chloro-3,3,3-trifluoropropene;
[5]Metal catalyst is DABCO ®MB20 a bismuth based carboxylate salt available commercially form Air Products & Chemicals;
[6]DABCO ®TMR-7 is an amine based trimerization catalyst used in PUR and PIR foam commercially available from Air Products & Chemicals The premix blends with Polycat®-12 and DABCO®-T were stored at 50° C. and samples were taken every seven days to determine the ability and the kinetics of the aged premix to produce polyurethane foam. Kinetic and polymerization parameters were measured for the aged premix and compared with the data from the non-aged premix. Approximately 25 g of the above premix were mixed with 25 g of isocyanate (MDI) in a mechanical agitator in a two litter plastic container. A sample of the component mixture excluding the isocyanate was place in a close container and conditioned in an oven at 50° C. Samples were taken for foam preparation after 1 day, 7 days and 14 days. The samples were allow to reach equilibrium at room temperature and then were mixed with the corresponding amount of isocyanate under vigorous mechanical stirring provided by a mechanical mixing blade at about 6000 rpm. Foam rise was measured under sonar detection equipment (FOMAT equipment) and choice time was recorded for each case. Choice times were measured in seconds and it represents the time it takes each foaming mass to reach 80% of the full height. The FOMAT equipment can also provide time to reach 98% maximum height and at maximum height.

| Catalyst | Use level (PPHP) | Choice Time (80% H) (Seconds) | Rise Time (98% H) (Seconds) | Maximum Height (Seconds) |
|---|---|---|---|---|
| PC-12 | 2.0 | 9.5 | 19.3 | 42.3 |
| DABCO ®T | 4.0 | 6.6 | 20.3 | 29.8 |

Time for maximum rise speed (Time $V_{max}$) and gel time were also measured with no ageing (initial):

| Catalyst | Use level (PPHP) | Cream time (Seconds) | Time $V_{max}$ (Seconds) | Gel Time (Seconds) |
|---|---|---|---|---|
| PC-12 | 2.0 | 3.1 | 5.6 | 16 |
| DABCO ®T | 4.0 | 1.6 | 3.3 | 9 |

After one week ageing, and increase in $V_{max}$ time and rise time was measured for both catalysts but the worse case corresponded to DABCO®-T catalyst. However, Polycat®-12 also showed significant slowing down in activity as evidenced by the increase in ΔRise Time.

| Catalyst | Use Level | Initial Time $V_{max}$ | 1 Week Time $V_{max}$ | $\Delta V_{max}$ | Initial Rise Time | 1 Week Rise Time | Δ Rise Time |
|---|---|---|---|---|---|---|---|
| PC-12 | 2.0 | 5.6 | 6.8 | 1.2 | 19.3 | 30.5 | 11.2 |
| DABCO ®T | 4.0 | 3.3 | 8.7 | 5.4 | 20.3 | >120 | >100 |

Example 3: Evaluation of Formulations Containing Sterically Hindered Amine Catalysts and Functionalized Tertiary Amine Catalysts Having NCO Reactive Groups in the Presence of Standards Organic Mono-Carboxylic Acids Using HFO as Blowing Agent Trans-1-Chloro-3,3,3-Trifluoropropene In this example the sterically hindered tertiary amine catalyst Polycat®-12 and the OH-containing tertiary amine catalyst DABCO®-T were evaluated in the presence of a organic carboxylic mono-acid.

| Catalyst/Acid | Use level (PPHP) | Catalyst/Acid Molar Ratio | Choice Time (80% H) (Seconds) | Rise Time (98% H) (Seconds) | Maximum Height (Seconds) |
|---|---|---|---|---|---|
| PC-12 (N-methyl-dicyclohexylamine) | 2.0 | — | 9.5 | 19.3 | 42.3 |
| DABCO ®T/Pivalic | 6.79 | 1/1 | 13.1 | 30.7 | 39.4 |
| DABCO ®T/Pivalic | 9.59 | 1/2 | 15.4 | 39.0 | 53.9 |
| DABCO ®T/Valeric | 9.59 | 1/2 | 23.4 | 41.0 | 53.5 |
| DABCO ®T/2-EHA | 11.89 | 1/2 | 50.9 | 73.4 | 92.0 |
| DABCO ®T/Capric | 13.42 | 1/2 | 28.1 | 45.8 | 57.0 |

| Catalyst | Use level (PPHP) | Catalyst/Acid Molar Ratio | Cream time (Seconds) | Time $V_{max}$ (Seconds) | Gel Time (Seconds) |
|---|---|---|---|---|---|
| PC-12 (N-methyl-dicyclohexylamine) | 2.0 | — | 3.1 | 5.6 | 16 |
| DABCO ®T/Pivalic | 6.79 | 1/1 | 2.6 | 5.0 | 14 |
| DABCO ®T/Pivalic | 9.59 | 1/2 | 3.0 | 5.6 | 18 |
| DABCO ®T/Valeric | 9.59 | 1/2 | 3.2 | 5.8 | 15 |
| DABCO ®T/2-EHA | 11.89 | 1/2 | 3.7 | 6.4 | 15 |
| DABCO ®T/Capric | 13.42 | 1/2 | 3.0 | 6.0 | 16 |

The premix blends with Polycat®-12 and DABCO®-T and the acid were stored at 50° C. and samples were taken every seven days to determine the ability and the kinetics of the aged premix B to produce polyurethane foam. Kinetic and polymerization parameters were measured for the aged premix and compared with the data from the non-aged premix. The data shows that combining DABCO®-T with a mono-carboxylic acid helped improving the stability relative to free DABCO®-T. However, the system stability is affected as evidenced by the increase of ΔRise time.

| Catalyst | Use Level | Initial Time $V_{max}$ | 1 Week Time $V_{max}$ | $\Delta V_{max}$ | Initial Rise Time | 1 Week Rise Time | Δ Rise Time |
|---|---|---|---|---|---|---|---|
| PC-12 (N-methyl-dicyclohexylamine) | 2.0 | 5.6 | 6.8 | 1.2 | 19.3 | 30.5 | 11.2 |
| DABCO®T/Pivalic(1/1) | 6.79 | 5.0 | 6.4 | 1.4 | 30.7 | 60.3 | 29.6 |
| DABCO®T/Pivalic(1/2) | 9.59 | 5.6 | 6.4 | 0.8 | 39.0 | 51.0 | 12.0 |
| DABCO®T/Valeric | 9.59 | 5.8 | 6.6 | 0.8 | 41.0 | 50.8 | 9.8 |
| DABCO®T/2-EHA | 11.89 | 6.4 | 7.0 | 0.6 | 73.4 | 92.0 | 18.6 |
| DABCO®T/Capric | 13.42 | 6.0 | 6.8 | 0.8 | 45.8 | 53.5 | 7.7 |

Example 4: Evaluation of Formulations Containing Strong Organic Base (TMG) in the Presence of HFO as Blowing Agent Trans-1-Chloro-3,3,3-Trifluoropropene This example shows the performance of TMG as the main non-metal catalyst and its effect in accelerating the front end the reaction.

| Catalyst | Use level (PPHP) | Choice Time (80% H) (Seconds) | Rise Time (98% H) (Seconds) | Maximum Height (Seconds) |
|---|---|---|---|---|
| TMG | 2.0 | 5.0 | 12.3 | 14.9 |

| Catalyst | Use level (PPHP) | Cream time (Seconds) | Time $V_{max}$ (Seconds) | Gel Time (Seconds) |
|---|---|---|---|---|
| TMG | 2.0 | 1.8 | 3.3 | 6 |

The table below shows the results obtained when the premix blend B was aged overtime. The results indicate a substantial deterioration in the speed of reaction indicating that although TMG can provide fast initial kinetic it is also contributing to decomposition of the premix blend containing HFO blowing agent resulting in long term deterioration of the speed of polymerization.

| Catalyst | Use Level | Initial Time $V_{max}$ | 2 Week Time $V_{max}$ | $\Delta V_{max}$ | Initial Rise Time | 2 Week Rise Time | Δ Rise Time |
|---|---|---|---|---|---|---|---|
| TMG | 2.0 | 3.3 | 10.4 | 7.1 | 12.3 | 24.5 | 12.2 |

Example 5: Evaluation of Formulations Containing Strong Organic Base (TMG) and/or Functionalized Tertiary Amine Catalysts in the Presence of Conventional Organic Carboxylic Acids Using HFO as Blowing Agent Trans-1-Chloro-3,3,3-Trifluoropropene This example shows the performance of TMG when used in combination with a standard organic mono-carboxylic acid formic acid (FA).

| Catalyst | Use level (PPHP) | Choice Time (80% H) (Seconds) | Rise Time (98% H) (Seconds) | Maximum Height (Seconds) |
|---|---|---|---|---|
| TMG/FA | 8.8 | 10.2 | 22.0 | 32.7 |

| Catalyst | Use level (PPHP) | Cream time (Seconds) | Time $V_{max}$ (Seconds) | Gel Time (Seconds) |
|---|---|---|---|---|
| TMG/FA | 8.8 | 3.0 | 5.6 | 10 |

The table below shows the results obtained when the premix blend B was aged overtime showing that deterioration has been minimized but at the expense of significant slowdown at the front end of the reaction ad evidenced by the higher $V_{max}$ time of 5.6 versus the one obtained with TMG in the absence of acid ($V_{max}$=3.3 seconds).

| Catalyst | Use Level | Initial Time $V_{max}$ | 1 Week Time $V_{max}$ | $\Delta V_{max}$ | Initial Rise Time | 1 Week Rise Time | Δ Rise Time |
|---|---|---|---|---|---|---|---|
| TMG/FA | 8.8 | 5.6 | 7.3 | 1.7 | 22.0 | 22.2 | 0.2 |

Example 6: Evaluation of Formulations Containing Strong Organic Base (TMG) in the Presence of Organic Carboxylic Di-Acids Succinic Acid Using HFO as Blowing Agent Trans-1-Chloro-3,3,3-Trifluoropropene This example shows the performance of TMG when used in combination with organic carboxylic di-acid succinic acid (SA) at various levels.

| Catalyst | TMG/SA molar ratio | PPHP | Choice Time (80% H) (Seconds) | Rise Time (98% H) (Seconds) | Maximum Height (Seconds) |
|---|---|---|---|---|---|
| 6-1 | 1.0/0.5 | 9.08 | 6.8 | 12.0 | 15.1 |
| 6-2 | 1.0/0.6 | 9.69 | 8.4 | 12.3 | 18.2 |

Samples of formulation B were aged as previously described and measurements were carried out at t=0 (initial) and after 7 days and after 14 days.

| | Aging Time | | | | | |
|---|---|---|---|---|---|---|
| | 0 Days | | 7 Days | | 14 days | |
| | Catalyst | | | | | |
| | 6-1 | 6-2 | 6-1 | 6-2 | 6-1 | 6-2 |
| Cream Time (s) | 1.4 | 1.1 | 2.3 | 1.3 | 2.9 | 1.5 |
| Time $V_{max}$ (Seconds) | 2.9 | 2.7 | 5.0 | 3.1 | 6.4 | 3.3 |
| Gel Time (Seconds) | 4 | 4 | 7 | 5 | 9 | 4 |

The following ageing data highlights the results corresponding to example 6-2 which shows essentially a very small change in the $V_{max}$ after one, two and three weeks of ageing showing the best case achieved for system stability with HFO blowing agent.

| Catalyst | Use level (PPHP) | Aging Time (days) | Cream time (Seconds) | Time $V_{max}$ (Seconds) | $\Delta V_{max}$ | Gel Time (Seconds) |
|---|---|---|---|---|---|---|
| 6-2 | 9.69 | 0 | 1.1 | 2.7 | 0.0 | 4 |
| 6-2 | 9.69 | 7 | 1.3 | 3.1 | 0.4 | 5 |
| 6-2 | 9.69 | 14 | 1.5 | 3.3 | 0.2 | 4 |

Example 7: Evaluation of Formulations Containing Functionalized Tertiary Amine Catalysts Having NCO Reactive Groups in the Presence of Organic Carboxylic Di-Acids Succinic Acid Using HFO as Blowing Agent Trans-1-Chloro-3,3,3-Trifluoropropene This example shows the performance of DABCO®-T when used in combination with organic carboxylic di-acid succinic acid (SA) at various levels.

| Catalyst | DABCO®-T/SA molar ratio | PPHP | Choice Time (80% H) (Seconds) | Rise Time (98% H) (Seconds) | Maximum Height (Seconds) |
|---|---|---|---|---|---|
| 7-1 | 1.0/0.5 | 11.23 | 14.7 | 22.9 | 28.8 |
| 7-2 | 1.0/0.6 | 11.88 | 15.8 | 24.9 | 31.1 |

Samples were aged as previously described and measurements were carried out at t=0 (initial) and after 7 days and after 14 days.

| | Aging Time | | | | | |
|---|---|---|---|---|---|---|
| | 0 Days | | 7 Days | | 14 days | |
| | Catalyst | | | | | |
| | 7-1 | 7-2 | 7-1 | 7-2 | 7-1 | 7-2 |
| Cream Time (s) | 1.2 | 1.2 | 1.9 | 1.8 | 4.6 | 2.9 |
| Time $V_{max}$ (Seconds) | 2.9 | 2.9 | 4.6 | 4.1 | 12.8 | 11.0 |
| Gel Time (Seconds) | 6 | 6 | 11 | 12 | 17 | 16 |

The following ageing data highlights the results corresponding to example 7-2 which shows essentially a very small change in the $V_{max}$ after one, two and three weeks of ageing. Although SA provides improvement, the increase in $V_{max}$ is still very significant when ageing the premix blend B over a two weeks period.

| Catalyst | Use level (PPHP) | Aging Time (days) | Cream time (Seconds) | Time $V_{max}$ (Seconds) | Gel Time (Seconds) |
|---|---|---|---|---|---|
| 7-2 | 11.88 | 0 | 1.2 | 2.9 | 6 |
| 7-2 | 11.88 | 7 | 1.8 | 4.1 | 12 |
| 7-2 | 11.88 | 14 | 2.9 | 11.0 | 16 |

Example 8: Evaluation of Formulations Containing Functionalized Tertiary Amine Catalysts Having NCO Reactive Groups in the Presence of Organic Carboxylic Di-Acids Using HFO as Blowing Agent Trans-1-Chloro-3,3,3-Trifluoropropene This example shows the performance of DABCO®-T when used in combination with various amounts of organic carboxylic di-acid glutaric acid (GA). A DABCO®-T/GA salt was prepared when the amine was combined with GA according to various molar ratios in EG.

| Catalyst | DABCO®-T/GA molar ratio | PPHP | Choice Time (80% H) (Seconds) | Rise Time (98% H) (Seconds) | Maximum Height (Seconds) |
|---|---|---|---|---|---|
| 8-1 | 1.0/0.5 | 8.71 | 14.4 | 25.3 | 35.2 |
| 8-2 | 1.0/0.6 | 9.25 | 15.4 | 26.2 | 36.5 |
| 8-3 | 1.0/0.8 | 10.34 | 16.0 | 28.5 | 38.2 |
| 8-4 | 1.0/1.0 | 11.42 | 16.1 | 29.6 | 39.7 |

| | Aging Time | | | | | | | | | | | |
|---|---|---|---|---|---|---|---|---|---|---|---|---|
| | 0 Days | | | | 7 Days | | | | 14 days | | | |
| | Catalyst | | | | | | | | | | | |
| | 8-1 | 8-2 | 8-3 | 8-4 | 8-1 | 8-2 | 8-3 | 8-4 | 8-1 | 8-2 | 8-3 | 8-4 |
| Cream Time (s) | 1.7 | 1.9 | 1.9 | 2.0 | 2.4 | 2.1 | 1.9 | 1.9 | 4.3 | 3.4 | 2.2 | 2.1 |
| Time $V_{max}$ (Seconds) | 3.7 | 3.9 | 4.1 | 4.1 | 5.4 | 4.6 | 3.9 | 4.4 | 11.8 | 11.2 | 10.2 | 4.8 |
| Gel Time (Seconds) | 7.0 | 7.0 | 7.0 | 7.0 | 11 | 11 | 10 | 9.0 | 18 | 16 | 14 | 13 |

The following ageing data highlights the results corresponding to example 8-4 which surprisingly shows essentially no change in the $V_{max}$ after one week of ageing of premix blend B.

| Catalyst | Use level (PPHP) | Aging Time (days) | Cream time (Seconds) | Time $V_{max}$ (Seconds) | Gel Time (Seconds) |
|---|---|---|---|---|---|
| 8-4 | 6.0 | 0 | 2.0 | 4.1 | 7.0 |
| 8-4 | 6.0 | 7 | 1.9 | 4.4 | 9.0 |
| 8-4 | 6.0 | 14 | 2.1 | 4.8 | 13 |

Example 9: Evaluation of Formulations Containing Mixtures of Catalysts DABCO®-T/GA and TMG/SA in the Presence of HFO as Blowing Agent Trans-1-Chloro-3,3,3-Trifluoropropene This example shows the performance of combinations of DABCO®-T/GA and TMG/SA at different ratios in formulations using HFO as blowing agents. A DABCO®-T/GA solution was prepared by dissolving 1 mol of DABCO®-T and 1 mol of glutaric acid in sufficient EG to give a 80% solution of DABCO®-T/GA salt in EG. Similarly, a TMG/SA solution was prepared by mixing 1 mol of TMG with 0.6 mol of SA in sufficient EG to give a 65% solution of TMG/SA salt in EG.

| Catalyst TMG-SA/ DABCO ®- T-GA % ratio | Catalyst # | Use level (PPHP) | Choice Time (80% H) (Seconds) | Rise Time (98% H) (Seconds) | Maximum Height (Seconds) |
|---|---|---|---|---|---|
| 100/0 | 10-1 | 6.0 | 5.2 | 13.9 | 20.9 |
| 75/25 | 10-2 | 6.0 | 5.8 | 15.3 | 22.8 |
| 50/50 | 10-3 | 6.0 | 6.6 | 18.0 | 23.4 |
| 25/75 | 10-4 | 6.0 | 8.6 | 30.9 | 39.0 |
| 0/100 | 10-5 | 6.0 | 11.4 | 33.4 | 48.1 |

The table below shows the results obtained when the premix blend B was aged overtime showing that deterioration has been minimized when compared to standard hindered amines such as PC-12. The results show that much higher $\Delta V_{max}$ was obtained with Polycat®-12 than any of the selected amine-acid combinations. A sample of the component mixture excluding the isocyanate was place in a close container and conditioned in an oven at 50° C. Samples were taken for foam preparation after 0 day and 7 days. The samples were allow to reach equilibrium at room temperature and then were mixed with the corresponding amount of isocyanate under vigorous mechanical stirring provided by a mechanical mixing blade at about 6000 rpm. Foam rise was measured under sonar detection equipment (previously described FOMAT equipment) and choice time was recorded for each case.

The table below shows the results obtained when the premix blend B was aged overtime showing that deterioration has been minimized when compared to standard hindered amines such as PC-12. The results show that much higher $\Delta V_{max}$ was obtained with Polycat®-12 than any of the selected amine-acid combinations.

While the invention has been described with reference to certain aspects, it will be understood by those skilled in the art that various changes may be made and equivalents may be substituted for elements thereof without departing from the scope of the invention. The various aspects disclosed herein can be used alone or in singular or multiple combinations with each other. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and combinations thereof falling within the scope of the appended claims.

The following is claimed:

1. A polyol premix composition comprising at least one hydrohaloolefin blowing agent, at least one polyol, and at least one salt of at least one organic carboxylic acid component and at least one member selected from the group consisting of tetramethylguanidine, N,N-bis(3-dimethylaminopropyl)-N-isopropanolamine, N,N-dimethylaminoethyl-N'-methyl ethanolamine, N,N,N'-trimethylaminopropyl ethanolamine, N,N-dimethyl-N',N'-2-hydroxy(propyl)-1,3-propylenediamine, dimethylaminopropylamine, (N,N-dimethylaminoethoxy)ethanol, methyl-hydroxy-ethyl-piperazine, bis(N,N-dimethyl-3-aminopropyl)amine, N,N-dimethylaminopropyl urea, N,N'-bis(3-dimethylaminopropyl) urea, bis(dimethylamino)-2-propanol, N-(3-aminopropyl)imidazole), N-(2-hydroxypropyl)imidazole, and N-(2-hydroxyethyl) imidazole, 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl bis(aminoethyl) ether or combinations thereof, wherein the at least one organic carboxylic acid component comprises at least one member selected from the group consisting of malonic acid, maleic acid, succinic acid, glutaric acid, adipic acid, pimelic acid, suberic acid, azelaic acid, sebacic acid, glutaconic acid, traumatic acid, muconic acid, phthalic acid, isophthalic acid, terephthalic acid, polyacrylic acid, and combinations thereof, wherein the hydrohaloolefin blowing agent comprises a fluorine, chlorine or combinations thereof, wherein the hydrohaloolefin blowing agent is present in an amount between 8 and 20 parts by weight per hundred parts by weight of the at least one polyol, and wherein the at least one salt is present in an amount

| | Aging Time | | | | | | | | | | |
|---|---|---|---|---|---|---|---|---|---|---|---|
| | 0 Days | | | | | 7 Days | | | | | |
| | Catalyst | | | | | | | | | | |
| | PC12 | 9-1 | 9-2 | 9-3 | 9-4 | 9-5 | PC12 | 9-1 | 9-2 | 9-3 | 9-4 | 9-5 |
| Cream Time (s) | 3.1 | 1.6 | 1.6 | 1.8 | 1.7 | 1.9 | — | 1.9 | 1.9 | 1.8 | 1.9 | 2.1 |
| Time $V_{max}$ (Seconds) | 5.6 | 3.5 | 3.5 | 3.7 | 3.9 | 4.4 | 6.8 | 3.7 | 3.9 | 4.1 | 4.4 | 4.4 |
| $\Delta V_{max}$ (Seconds) | — | — | — | — | — | — | 1.2 | 0.2 | 0.4 | 0.4 | 0.5 | 0 |
| Gel Time (Seconds) | 16 | 5 | 6 | 6 | 7 | 8 | — | 6 | 8 | 8 | 11 | 13 | between 6 and 11.88 parts by weight per hundred parts by weight of the at least one polyol.

2. The polyol premix composition of claim 1 further comprising an additional hydrohaloolefin.

3. The polyol premix composition of claim 1 in which the hydrohaloolefin blowing agent comprises trans-1-chloro-3,3,3-trifluoropropene.

4. The polyol premix composition of claim 1 that further comprises at least one solvent.

5. The polyol premix composition of claim 4 in which the solvent comprises at least one member selected from the group consisting of a glycol, water, and a polyol.

6. The polyol premix composition of claim 1 wherein the organic carboxylic acid comprises at least one member selected from the group consisting of succinic acid, glutaric acid, adipic acid, and combinations thereof.

7. The polyol premix composition of claim 1 further comprising at least one cell stabilizer selected from the group consisting of polyalkylsiloxane, alkylene glycol-modified dimethylpolysiloxane, and combinations thereof, wherein the at least one cell stabilizer is present in an amount between 0.1 and 10 parts by weight per hundred parts by weight of the at least one polyol.

8. The polyol premix composition of claim 1 further comprising at least one crosslinking agent selected from the group consisting of trimethylolpropane, diethyltoluenediamine, chlorodiaminobenzene, diethanolamine, diisopropanolamine, triethanolamine, tripropanolamine, 1,6-hexanediamine, and combinations thereof, wherein the at least one crosslinking agent is present in an amount between 0.20 and 10 parts by weight per hundred parts by weight of the at least one polyol.

9. The polyol premix composition of claim 1 further comprising at least one chain extender selected from the group consisting of dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, and combinations thereof, wherein the chain extender is present in an amount between 0.20 and 10 parts by weight per hundred parts by weight of the at least one polyol.

10. The polyol premix composition of claim 1 wherein the salt is obtained by combining about 10 to about 50% tetramethylguanidine and about 10 to about 50% succinic acid, and composition further comprises about 0 to about 50% of at least one of water or glycol diluent, wherein the pH of the composition is between 4 and 7.

11. The polyol premix composition of claim 5, wherein the solvent includes the glycol; and wherein the glycol comprises a glycol selected from the group consisting of ethylene glycol, propylene glycol, dipropylene glycol, polyethylene glycol, polypropylene glycol, and combinations thereof.

12. The polyol premix composition of claim 4, wherein the polyol includes a reaction product of at least one of ethylene oxide or propylene oxide with at least one of propylene glycol, 1,3-butane diol, 1,4-butane diol, 1,6-hexane diol, neopentyl glycol, dipropylene glycol, glycerol, diglycerol, cyclohexane diol, diethylenetriamine, tolylenediamine, diphenylmethanediamine, or triethanolamine.

13. The polyol premix composition of claim 4, wherein the polyol includes a reaction product of at least one of adipic acid, phthalic acid, or phthalic anhydride with at least one of ethylene glycol, diethylene glycol, polyethylene glycol, propylene glycol, dipropylene glycol, polypropylene glycol, or butanediol.

14. A polyol premix composition comprising at least one polyol;
at least one hydrohaloolefin blowing agent comprising a fluorine, a chlorine, or combinations thereof, wherein the at least one hydrohaloolefin blowing agent is present in an amount between 8 and 20 parts by weight per hundred parts by weight of the at least one polyol;
a tetramethylguanidine salt of at least one acid selected from the group consisting of malonic, maleic, succinic, glutaric, adipic, pimelic, suberic, azelaic, sebacic, glutaconic, traumatic, muconic, phthalic, isophthalic, terephthalic, polyacrylic, and combinations thereof, and tetramethylguanidine; and
an amine salt of at least one acid selected from the group consisting of malonic, maleic, succinic, glutaric, adipic, pimelic, suberic, azelaic, sebacic, glutaconic, traumatic, muconic, phthalic, isophthalic, terephthalic acids, polyacrylic acid, and combinations thereof, and a tertiary amine containing an isocyanate reactive group selected from the group consisting of N,N-bis(3-dimethylaminopropyl)-N-isopropanolamine, N,N-dimethylaminoethyl-N'-methyl ethanolamine, N,N,N'-trimethylaminopropyl ethanolamine, N,N-dimethyl-N',N'-2-hydroxy(propyl)-1,3-propylenediamine, dimethylaminopropylamine, (N,N-dimethylaminoethoxy)ethanol, methyl-hydroxy-ethyl-piperazine, bis(N,N-dimethyl-3-aminopropyl)amine, N,N-dimethylaminopropyl urea, N,N'-bis(3-dimethylaminopropyl) urea, bis(dimethylamino)-2-propanol, N-(3-aminopropyl) imidazole, N-(2-hydroxypropyl)imidazole, and N-(2-hydroxyethyl) imidazole, 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl) ether, and combinations thereof, and wherein the sum of an amount of the guanidine salt and an amount of the amine salt is between 6 and 11.88 parts by weight per hundred parts by weight of the at least one polyol.

15. The pre-mix composition of claim 14,
wherein the at least one acid of the guanidine salt is selected from the group consisting of malonic, maleic, succinic, glutaric, adipic, pimelic, suberic, azelaic, sebacic, and combinations thereof;
wherein the at least one acid of the amine salt is selected from the group consisting of malonic, maleic, succinic, glutaric, adipic, pimelic, suberic, azelaic, sebacic, and combinations thereof; and
wherein the tertiary amine containing an isocyanate reactive group is selected from the group consisting of N,N-bis(3-dimethylaminopropyl)-N-isopropanolamine, N,N-dimethylaminoethyl-N'-methyl ethanolamine, N,N,N'-trimethylaminopropyl ethanolamine, bis(dimethylamino)-2-propanol, 2-[N-(dimethylaminoethoxyethyl)-N-methylamino]ethanol, N,N-dimethylaminoethyl-N'-methyl-N'-ethanol, dimethylaminoethoxyethanol, and combinations thereof.

16. The pre-mix composition of claim 15, wherein the tertiary amine containing an isocyanate reactive group is selected from the group consisting of N,N-bis(3-dimethylaminopropyl)-N-isopropanolamine, N,N-dimethylaminoethyl-N'-methyl ethanolamine, N,N,N'-trimethylaminopropyl ethanolamine, and combinations thereof.

17. The pre-mix composition of claim 15, further comprising a transition metal catalyst.

* * * * *